G. S. K. SWIFT.
AUTOMATIC GAS CUT-OFF.
APPLICATION FILED JUNE 13, 1913.
1,084,911.
Patented Jan. 20, 1914.
2 SHEETS—SHEET 1.
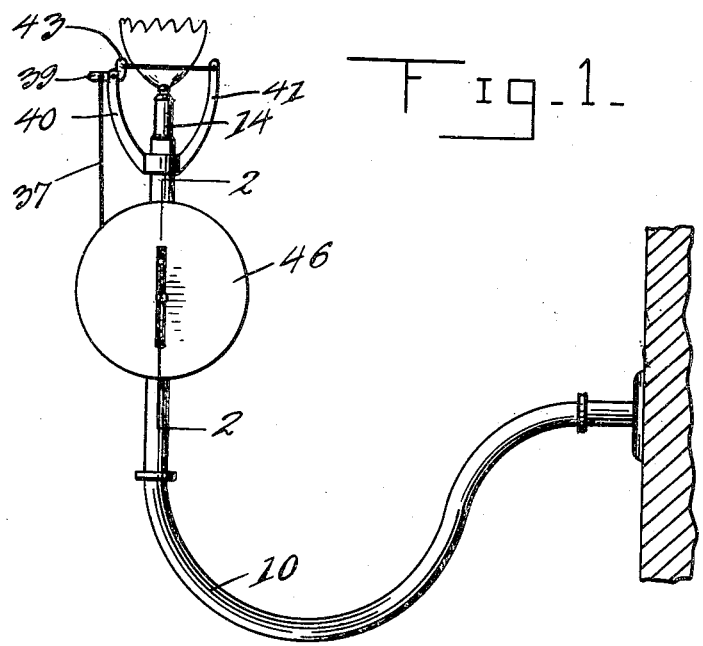
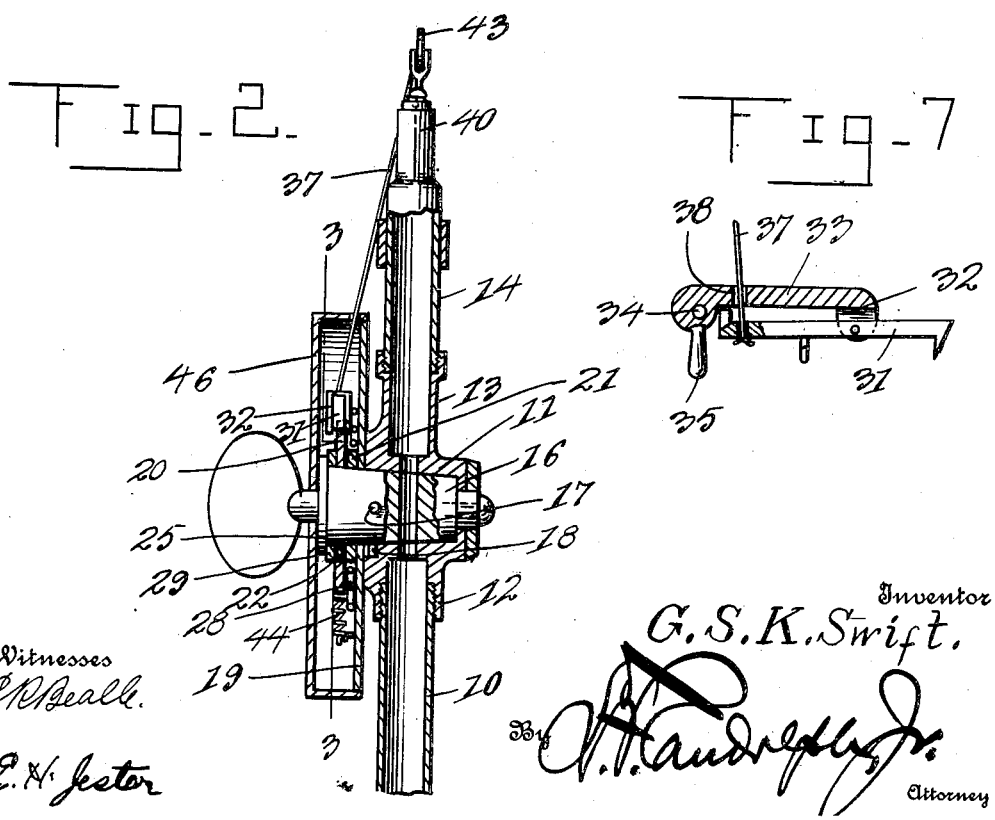
Witnesses
C. R. Beall.
E. N. Jester
Inventor
G. S. K. Swift.
By ............
Attorney G. S. K. SWIFT.
AUTOMATIC GAS CUT-OFF.
APPLICATION FILED JUNE 13, 1913.
1,084,911.
Patented Jan. 20, 1914.
2 SHEETS—SHEET 2.
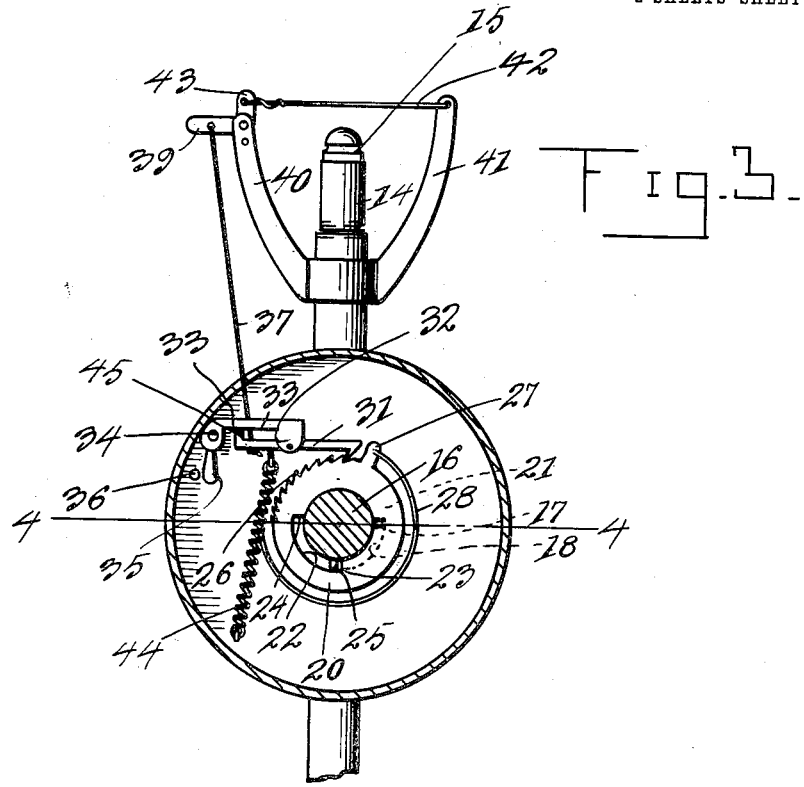
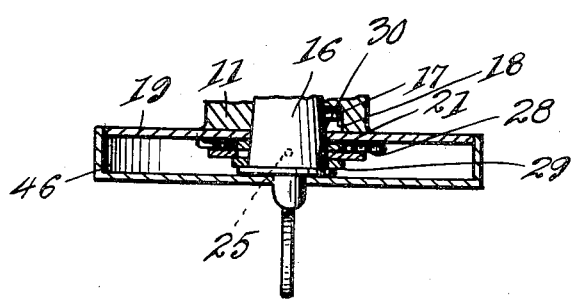
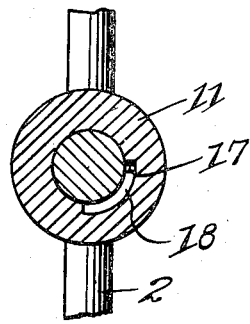
Witnesses
C. R. Bealle.
E. H. Jester.
Inventor
G. S. K. Swift,
By ..........
Attorney

UNITED STATES PATENT OFFICE.

GEORGE S. K. SWIFT, OF PROVIDENCE, RHODE ISLAND.

AUTOMATIC GAS CUT-OFF.

1,084,911. Specification of Letters Patent. Patented Jan. 20, 1914.

Application filed June 13, 1913. Serial No. 773,531.

*To all whom it may concern:*

Be it known that I, GEORGE S. K. SWIFT, a subject of the King of Norway, residing at Providence, in the county of Providence and State of Rhode Island, have invented certain new and useful Improvements in Automatic Gas Cut-Offs; and I do hereby declare the following to be a full, clear, and exact description of the invention, such as will enable others skilled in the art to which it appertains to make and use the same.

This invention relates to automatic gas cut offs and has for one of its objects the provision of extremely simple and reliable means which will operate automatically to rotate the gas cock and shut off the flow of gas when the flame is extinguished.

Another object of the invention resides in the provision of an automatic gas cut off including a spring actuated ratchet ring loosely connected to the gas cock, a pawl adapted to hold said ring against movement when the gas is lighted, a thermostatic member disposed in the heat zone of the gas flame, and a connection between said thermostatic member and the pawl, whereby the latter will be released from the ratchet ring when the gas is extinguished.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation, showing my device as it appears in use, Fig. 2 is a view taken on the plane of line 2—2 of Fig. 1, parts of the device being shown in elevation, Fig. 3 is a section taken on the plane of line 3—3 of Fig. 2, Fig. 4 is a horizontal sectional view on the plane of line 4—4 of Fig. 3, Fig. 5 is a transverse section through the cock and casing, showing the stop pin and recess, Fig. 6 is a plan view of the ratchet ring, and, Fig. 7 is a detail view, partly in section and partly in elevation, of the pawl and supporting arm therefor.

Referring in detail to the drawings by numerals, 10 designates a gas pipe; 11 a valve casing having the tubular extensions 12 and 13; 14 the burner pipe; and 15 the tip. The flow of gas through the valve casing is controlled by a tapered plug or cock 16, the rotational movement of which is limited by a pin 17 working within an arcuate recess 18, the latter being one quadrant in length. The foregoing parts are of the common construction and therefore no claim is made thereto.

In carrying out my invention, I provide a circular base plate 19 which is secured to the end of the valve casing and which surrounds the valve plug. A ratchet ring 20 is loosely mounted upon the valve plug and is spaced from the base plate 19 by means of the washer 21. This ratchet ring is formed with an arcuate recess 22 about a quadrant in length, forming the shoulders 23 and 24. A pin 25 is rigid with the plug and extends within the recess 22. The ratchet ring is formed upon its periphery with an arm 27 to which is connected one end of the torsion spring 28, the other end of the spring being connected to the base plate 19, as clearly shown in Fig. 4. This spring is coiled a number of times about the valve plug and tends to force the shoulder 23 normally against the pin 25 and shut off the flow of gas. A washer 29 is interposed between the outer face of the ratchet ring and the flange 30 formed upon the outer end of the cock.

To hold the ratchet ring against rotation in one direction, I provide a pawl 31 which is pivoted intermediate its ends between the ears 32 formed upon the arm 33. The arm 33 is pivoted at one end upon the stud 34 carried by the base plate 19 and is formed with a lateral projection 35 which is adapted to engage the stop pin 36 and limit the downward movement of the free extremity of the arm. A wire 37 is secured to the arm adjacent one end, extends upwardly through an opening 38 formed in the arm 33 and connects to a bell-crank lever 39, which is pivotally connected to an arm 40 secured to the burner tube 14. An arm 41 similar to the arm 40, extends upwardly on the other side of the burner tube and has connected to its upper extremity, one end of a thermostatic element or wire 42. The other end of this wire is connected to the arm 43 of the bell-crank lever.

When the device is in operation and the parts are arranged as shown in Fig. 3, the heat of the gas flame has expanded the wire 42 sufficiently to permit of the contractile spring 44 drawing the pawl into engagement with the teeth 26. The lower end of the spring is secured to the base plate 19 and the upper end is connected to the pawl 31 between its pivot point and the point of connection with the wire 37. This spring tends to draw the free end of the arm 33 downwardly and also to raise the hooked end of the pawl from engagement with the teeth 26. The projection 35 and pin 36 prevent the free end of the arm 33 swinging downwardly beyond a predetermined distance. It will be noted that a contraction of the thermostatic element 42 and a normal expansion thereof causes the arm 33 to swing about its pivot point, but does not cause the pawl 31 to swing about its pivot, said pawl moving with the arm 33 as though it were an integral part thereof.

Should the gas flame be extinguished without turning the cock the wire 42 will contract and cause the bell-crank lever 39 to oscillate so as to draw the wire 37 upwardly and this wire being attached to the pawl 31, will raise the latter from engagement with the teeth 26 by causing the free end of the arm 33 to swing upwardly. The spring 28 will then rotate the ratchet ring in a clock-wise direction, causing the shoulder 23 to bear against the pin 25 and rotate the cock so as to shut off the flow of gas. The pin 17 will be moved from one end of the recess 18 to the other, and will check the rotational movement of the cock and ratchet ring. Should either of the wires 42 or 37 become loosened or break, the spring 44 will draw the hooked end of the pawl away from engagement with the teeth 26 and the gas will be shut off, as previously described. It will be noted that when the thermostatic element 42 broadens or expands an undue amount, and when the wire 37 breaks or becomes loosened, the spring 44 causes the pawl to swing about its pivot, the arm 33 remaining stationary. Should the gas be turned off by manually turning the cock, the pin 25 will be moved into engagement with the shoulder 24 of the ratchet ring and as soon as the thermostatic element cools the ring will be rotated so as to bring the shoulder 23 again into engagement with the pin 25. When the gas is turned on, the ring is rotated in a counter-clockwise direction so as to bring the teeth 26 under the toothed end of the locking pawl. After the gas has been lighted, the cock must be held a few seconds until the thermostatic element expands and permits the locking pawl to become operative.

It will be noted that the rear end of the pawl 31 is formed with a lateral projection 45 which engages the under side of the arm 33 so as to maintain the pawl normally parallel therewith. A casing 46 incloses the main portion of the device, as clearly shown in the drawings.

From the foregoing description taken in connection with the accompanying drawings, it will be evident that I have provided an automatically operated gas cut off which will not interfere with the turning of the gas cock and which will operate to shut off the flow of gas should the light be blown out or otherwise extinguished without cutting off the gas supply, and which will also operate should the thermostatic element or the connecting wire become loosened or break.

It is to be understood that while I have shown and described the preferred embodiment of my invention, I do not wish to be limited to this exact construction, combination, and arrangement of parts, but may make such changes as will fall within the spirit and scope of the invention as defined by the appended claims.

Having thus described my invention, what I claim is:—

1. In a device of the character described, a rotary burner valve, means arranged to close the valve when released, a pivoted arm having a limited movement toward said valve closing means, a retaining member pivotally connected intermediate its ends to one end of said arm and adapted to engage the valve closing means and hold the valve in its open position, a thermostatic element, a connection between said thermostatic element and retaining member, a contraction or expansion of the thermostatic element causing the arm to swing about its pivot and a spring connected to the retaining member whereby, when the thermostatic element breaks, the retaining member will be swung about its pivot away from engagement with the valve closing means.

2. In an automatic gas cut off, the combination with a gas fixture including a valve casing, a plug valve rotatable therein, and a burner tube, of a spring actuated ratchet member mounted on the plug valve and adapted to rotate said valve to cut off the flow of gas, a pivoted arm, means for limiting the swing of said arm, a pawl pivoted intermediate its ends to one extremity of the arm and adapted to lockingly engage the ratchet member and hold the same against rotation, a thermostatic element positioned in the heat zone of the flame, connecting means between the thermostatic element and pawl, whereby the pivoted arm is moved away from the ratchet member as the thermostatic member contracts and spring means connected to said pawl for swinging the latter about its pivot should the thermostatic member break.

3. In an automatic gas cut off, the combination with a valve casing, a plug valve rotatable therein to control the flow of gas therethrough, and a burner tube, of a spring pressed ratchet member carried by the plug valve for rotating the same to cut off the flow of gas, an arm pivotally secured at one end, means for limiting the swing of the free extremity of the arm toward the ratchet member, a pawl pivoted intermediate its ends to the free extremity of said arm for locking engagement with the ratchet member, a thermostatic element disposed in the heat zone of the gas flame, connecting means between the thermostatic element and pawl, whereby the latter is moved away from the ratchet member as the thermostatic element contracts, and spring means for disengaging the pawl from the ratchet member should the connecting means be broken.

4. In an automatic gas cut off, the combination with a gas fixture including a valve casing, a plug valve rotatable therein, and a burner tube, of a spring actuated ratchet member carried by the plug valve to rotate the same and cut off the flow of gas, an arm pivotally secured at one end, means for limiting the movement of the free end of said arm toward the ratchet member, a pawl pivoted intermediate its ends to the free extremity of the arm for engagement with the ratchet member to hold the same against rotation, a thermostatic element, a pair of supporting arms secured to the burner tube, a bell-crank lever pivoted to the extremity of one of the supporting arms, the thermostatic element being connected to the other arm, and to the bell-crank lever, a connection between the pawl and bell-crank lever whereby the pawl is moved from engagement with the ratchet member when the thermostatic element contracts, and a spring for moving the pawl from engagement with the ratchet member when said connection is broken.

5. In an automatic gas cut off, the combination with a gas fixture including a valve casing, a plug valve rotatable therein, and a burner tube, of a ratchet ring mounted upon the plug valve, said ring being formed with teeth upon its periphery and provided with an inwardly opening arcuate recess, a pin carried by the valve for movement within said recess, a base plate, a torsion spring connected at one end to the base and at its other end to the ratchet ring, whereby the ring will normally hold the valve closed, an arm pivoted at one end to the base plate, a laterally extending projection formed upon said arm, a stop member rigid with the base plate for engagement by said projection, whereby the movement of the free extremity of the arm toward the ratchet ring is limited, a pawl pivoted intermediate its ends to the free extremity of the arm for locking engagement with the teeth of the ratchet ring whereby the valve may be retained in its open position, a pair of arms mounted upon the burner tube, a bell-crank lever pivoted to the extremity of one of said arms, a thermostatic element connected to the extremity of the other arm and to the bell crank lever, a wire connected at one end to the bell-crank lever and at the other end to the pawl adjacent one end thereof, a contraction of the thermostatic element causing the wire to raise the pawl and arm, and a spring secured to the pawl between its pivot point and the wire.

6. In an automatic gas cut-off, a rotary burner valve, a ratchet member arranged to close said valve when released, an arm pivotally secured at one end, means for limiting the movement of the free end of the arm toward the ratchet member, said arm being provided with an opening, a pawl pivoted intermediate its ends to the free end of the arms for engagement at one end with the ratchet member to hold the valve in its open position, a thermostatic element, a member secured to the other end of the pawl and extending through the opening formed in the pivoted arm, said member being moved longitudinally by the expansion and contraction of the thermostatic element, and a contractile spring secured to the pawl intermediate its pivot point and the connection to said member, the contraction or expansion of the thermostatic element causing the pivoted arm and pawl to move toward or away from the ratchet member without changing their relative position, a breaking of the thermostatic element or of the arm actuating member permitting the spring to swing the pawl about its pivot away from engagement with the ratchet member.

In testimony whereof I affix my signature in presence of two witnesses.

GEORGE S. K. SWIFT.

Witnesses:
JOSIAH M. BARNEY,
CHARLES MACKINNON.